United States Patent
Koreeda et al.

(10) Patent No.: US 7,287,912 B2
(45) Date of Patent: Oct. 30, 2007

(54) OPTICAL CONNECTOR IMPROVED IN MOUNTABILITY WITHOUT AN INCREASE IN NUMBER OF COMPONENTS

(75) Inventors: Yuichi Koreeda, Tokyo (JP); Yasutaka Hiroki, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 11/320,083

(22) Filed: Dec. 28, 2005

(65) Prior Publication Data

US 2006/0140542 A1    Jun. 29, 2006

(30) Foreign Application Priority Data

Dec. 28, 2004   (JP)   ............................. 2004-380685

(51) Int. Cl.
*G02B 6/38*   (2006.01)

(52) U.S. Cl. .............................. 385/75; 385/55; 385/58; 385/60; 385/70; 385/72

(58) Field of Classification Search ................. 385/70, 385/72, 75

See application file for complete search history.

(56) References Cited

U.S. PATENT DOCUMENTS

| 5,274,729 A | 12/1993 | King et al. |
| 5,647,043 A | 7/1997 | Anderson et al. |
| 2003/0002808 A1* | 1/2003 | Lampert et al. ............... 385/70 |

FOREIGN PATENT DOCUMENTS

| JP | 6186456 | 7/1994 |
| JP | 9113750 | 5/1997 |
| JP | 2004-045622 | 2/2004 |

* cited by examiner

*Primary Examiner*—Frank G. Font
*Assistant Examiner*—Ryan Lepisto
(74) *Attorney, Agent, or Firm*—Collard & Roe, P.C.

(57) ABSTRACT

In an optical connector having a housing defining an area surrounding a connection axis of the optical connector, the housing has a pair of slits spaced from each other and defining an elastic portion therebetween. A protruding portion protrudes from the elastic portion outward in a radial direction of the housing. A mounting portion is faced to the protruding portion with a space left therebetween.

19 Claims, 4 Drawing Sheets

OPTICAL CONNECTOR IMPROVED IN MOUNTABILITY WITHOUT AN INCREASE IN NUMBER OF COMPONENTS

This application claims priority to prior Japanese patent application JP 2004-380685, the disclosure of which is incorporated herein by reference.

BACKGROUND OF THE INVENTION

This invention relates to an optical connector and, in particular, to an optical connector having a housing defining an area surrounding a connection axis. In the present specification and the appended claims, the "optical connector" should be broadly understood so as to include an adapter, a splicing module, and the like used in optical connection.

For example, Japanese Unexamined Patent Application Publication (JP-A) No. 2004-45622 discloses, as an optical adapter, an optical connector for use in connecting optical fibers. In the optical adapter, end portions of a pair of optical fibers are inserted into a pair of cylindrical ferrules, respectively. Axial end faces of the ferrules are faced to each other so that the optical fibers are spliced and optically connected to each other. The optical adapter is mounted to a panel by the use of a fitting bracket attached to a housing of the optical adapter.

In such a structure comprising the fitting bracket attached to the housing, the number of components is increased and an operation of attaching the fitting bracket is required. Since the fitting bracket is attached, it is difficult to reduce the size of the optical adapter. Further, in case where the housing is changed in design, it is necessary to change mold components for use in production of the housing and to use a new fitting bracket adapted to a new design of the housing. If the thickness of the panel is changed, it is necessary to alter the mold components in order to produce the housing adapted to the thickness of the panel. Thus, there is no degree of freedom with respect to the thickness of the panel.

SUMMARY OF THE INVENTION

It is therefore an object of this invention to provide an optical connector which can be reduced in number of components.

It is another object of this invention to provide an optical connector which can easily be mounted to a mounting object.

It is still another object of this invention to provide a connector which is easily adaptable to a mounting object if the thickness of the mounting object is changed.

Other objects of the present invention will become clear as the description proceeds.

According to an aspect of the present invention, there is provided an optical connector having a housing defining an area surrounding a connection axis of the optical connector, the housing comprising a pair of slits spaced from each other, an elastic portion defined between the slits, a protruding portion protruding from the elastic portion outward in a radial direction of the housing, and a mounting portion faced to the protruding portion with a space left therebetween.

According to another aspect of the present invention, there is provided an optical connection adapter which comprises a housing defining an area surrounding a connection axis of the optical connection adapter, a connection assisting mechanism disposed inside the housing and on the connection axis for assisting optical connection, and a mechanism holding member connected to the housing and holding the connection assisting mechanism, the housing comprising a pair of slits spaced from each other, an elastic portion defined between the slits, a protruding portion protruding from the elastic portion outward in a radial direction of the housing, and a mounting portion faced to the protruding portion with a space left therebetween.

DESCRIPTION OF THE PREFERRED EMBODIMENTS

Figure 1:
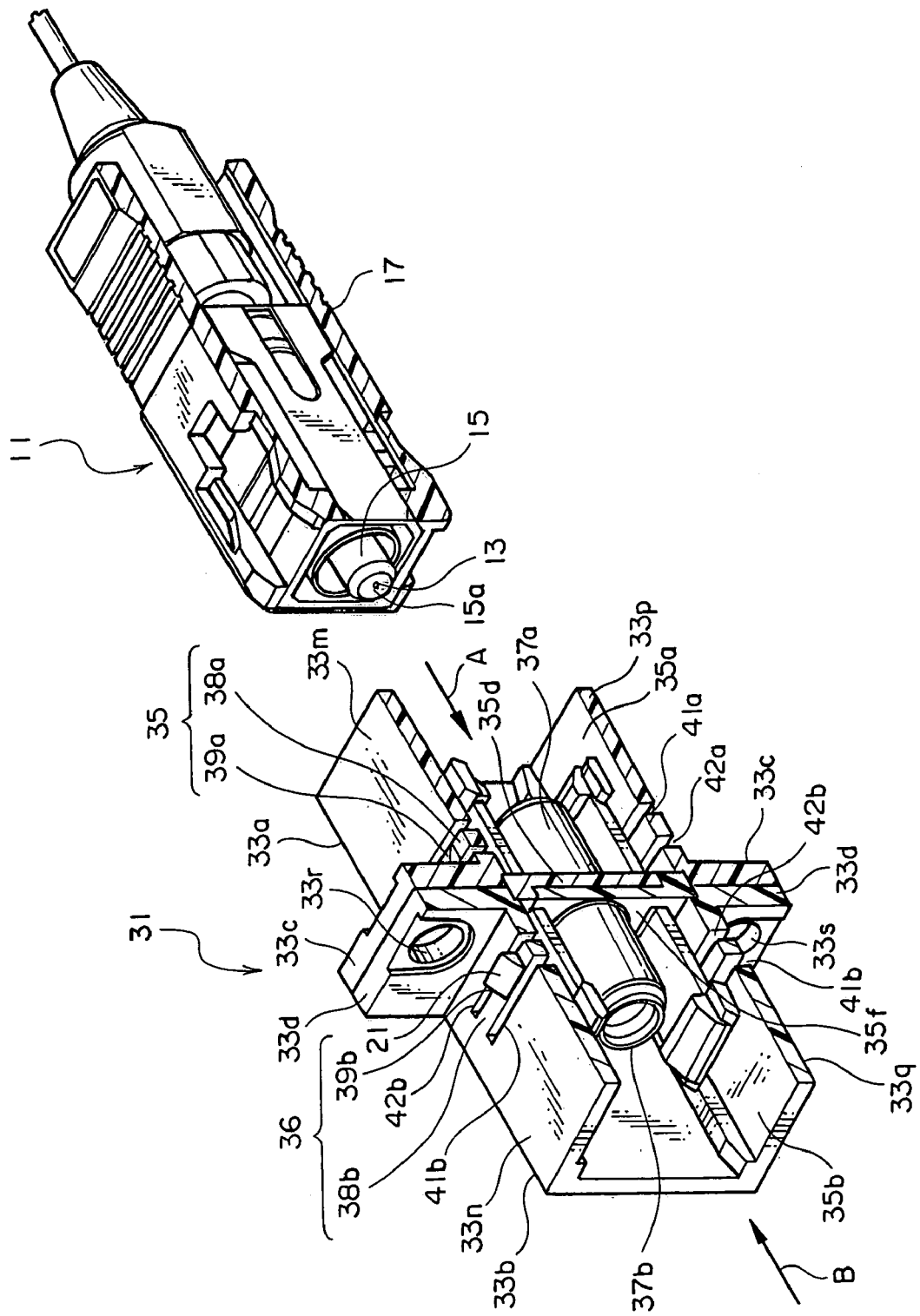
FIG. 1 is a sectional perspective view of an optical connector according to an embodiment of this invention together with a connection object.

Referring to FIG. 1, description will be made of an optical connector according to an embodiment of this invention together with a connection object.

The optical connector depicted at 31 in the figure corresponds to a structure called an adapter for use in optically connecting optical fibers. In the following description, the optical connector 31 will be called an optical adapter.

Since each optical fiber 13 is very thin, a plug 11 as a connection object is connected to an end portion of the optical fiber in order to facilitate optical connection. The plug 11 can be fitted into the interior of the adapter 31 at one end thereof in a fitting direction A. Into the interior of the adapter 31 at the other end thereof, another plug (not shown) can be fitted in a fitting direction B opposite to the fitting direction A. In the interior of the adapter 31, the two plugs are faced to each other. As a result, the optical fibers connected to these plugs are optically connected to each other.

The plug 11 comprises a cylindrical ferrule 15 for holding the optical fiber 13 and a plug housing 17 receiving and holding the ferrule 15. Another plug has a structure similar to the plug 11 illustrated in the figure. When the two plugs are normally fitted into the interior of the adapter 31, axial end faces 15a of the ferrules 15 are brought into contact with each other to optically connect the optical fibers 13 to each other.

Figure 2:
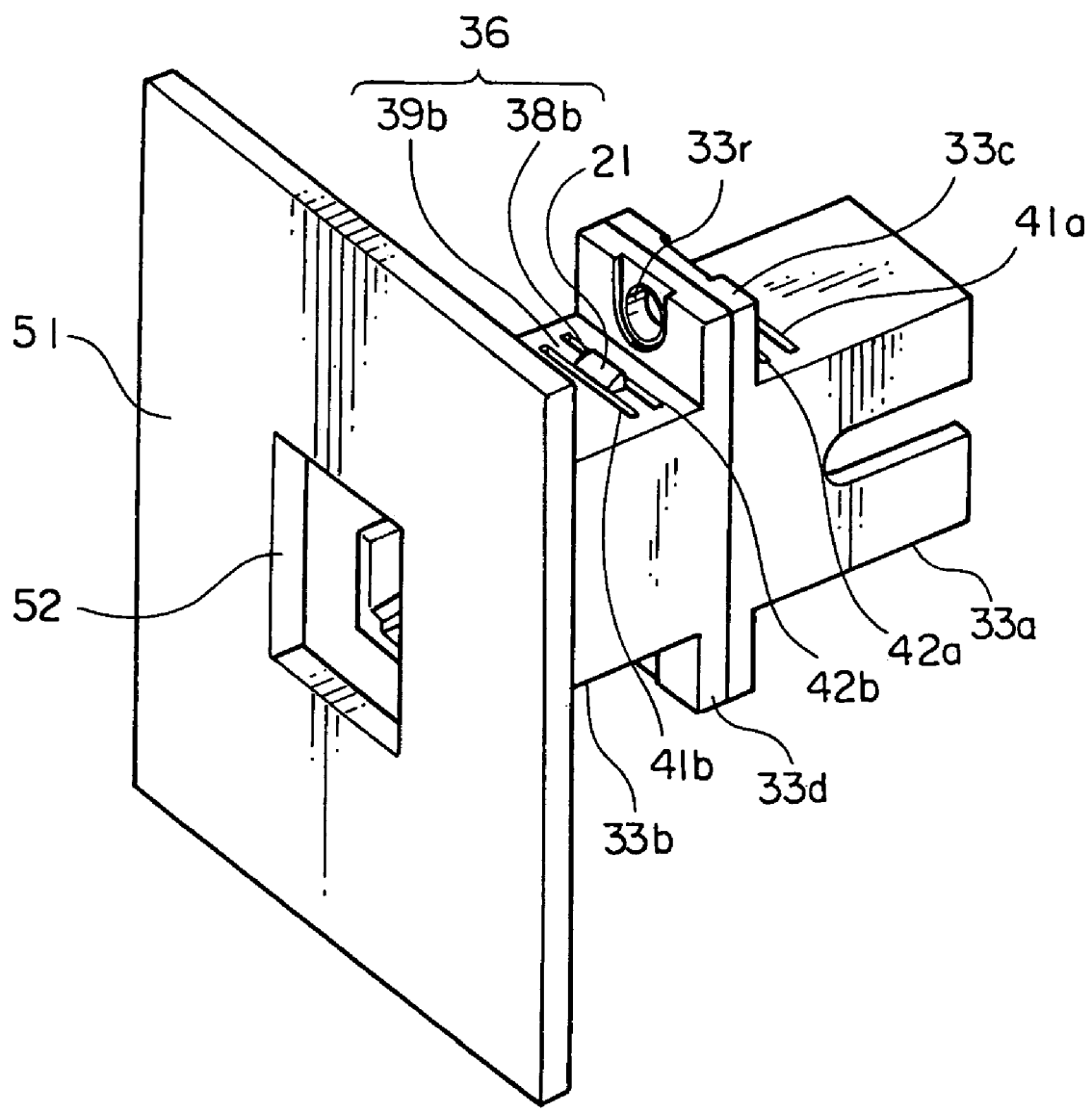
FIG. 2 is a perspective view of the optical connector illustrated in FIG. 1 before it is mounted to a panel.
Figure 3:
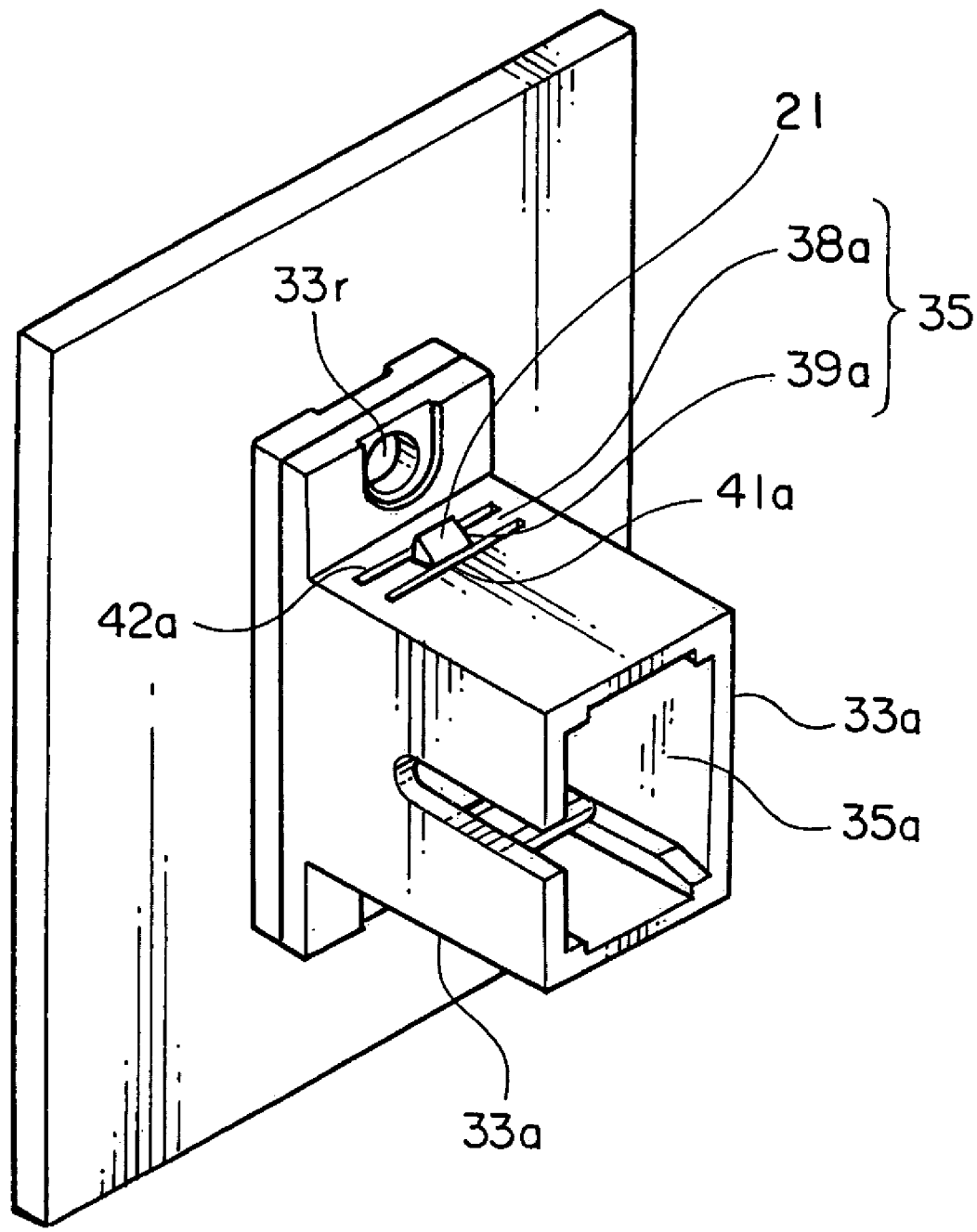
FIG. 3 is a perspective view of the optical connector illustrated in FIG. 1 when it is mounted to the panel.

Referring to FIGS. 2 and 3 in addition to FIG. 1, the adapter 31 will be described.

The adapter 31 comprises a pair of housings 33a and 33b having a rectangular cylindrical shape and butted to each other in the fitting directions A and B. The housings 33a and 33b are provided with fitting portions 35a and 35b as square holes extending in the fitting directions A and B, respectively. The fitting portions 35a and 35b are provided with cylindrical ferrule holding portions 37a and 37b for receiving the ferrules 15 inserted therein, respectively. The ferrule holding portions 37a and 37b extend from bottom plate portions 35d and 35f of the fitting portions 35a and 35b along a connection axis towards opening sides, respectively. The housings 33a and 33b define an area surrounding the connection axis.

In order to achieve optical connection of the optical fibers, the plug 11 in FIG. 1 is fitted to the fitting portion 35a of the adapter 31 in the fitting direction A. At this time, the ferrule 15 of the plug 11 is inserted into the ferrule holding portion 37a. Another plug is fitted to the fitting portion 35b of the adapter 31 in the fitting direction B. At this time, a ferrule of another plug is inserted into the ferrule holding portion 37b. In the interior of the ferrule holding portions 37a and 37b, the two ferrules are brought into contact with each other. As a consequence, the optical fibers are optically connected to each other. Thus, a combination of the ferrule holding portions 37a and 37b serves as a splicing device for splicing two ferrules or the optical fibers to each other.

The housings 33a and 33b have flange-like or plate-like mounting portions 33c and 33d formed at butted portions thereof, respectively. The mounting portions 33c and 33d are provided with mounting holes 33r and 33s, respectively, which allow the adapter 31 to be mounted to a housing or a panel (mounting object) 51 of an apparatus by screws.

The housings 33a and 33b have engaging portions 35 and 36 formed near the mounting portions 33c and 33d to engage the adapter 31 with a panel 51 in the fitting directions A and B. The engaging portion 35 comprises an elastic portion 38a and a protruding portion 39a formed on one side wall 33m among four side walls of the housing 33a. Another engaging portion of a similar structure is formed on the side wall 33p of the housing 33a which is faced to the side wall 33m in a radial direction.

The engaging portion 36 comprises an elastic portion 38b and a protruding portion 39b formed on one side wall 33n among four side walls of the housing 33b. Another engaging portion of a similar structure is formed on the side wall 33q of the housing 33b which is faced to the side wall 33n in a radial direction. The protruding portions 39a and 39b have slopes 21 inclined so that the heights from the elastic portions 38a and 38b are increased towards the mounting portions 33c and 33d, respectively.

The elastic portions 38a and 38b are defined between a pair of slits (such as grooves or openings faced to each other) 41a and 42a and between a pair of slits 41b and 42b, respectively. The slits 41a, 42a, 41b, and 42b extend in parallel to one another in a direction perpendicular to the fitting directions A and B.

Referring to FIGS. 2 and 3, description will be made of an operation of mounting the adapter 31 to the panel 51.

At first, one housing 33b is inserted into a window portion 52 formed on the panel 51. When the housing 33b is inserted, an edge of the window portion 52 is contacted with the protruding portion 39b of the housing 33b. When the housing 33b is further inserted, the slope 21 of the protruding portion 39b is pushed by the edge of the window portion 52 so that the elastic portion 38b is elastically deformed, with torsion, towards the interior of the housing 33b. When the protruding portion 39b passes over the edge of the window portion 52, the elastic portion 38b is restored by its elastic force. As a result, a part of the panel 51 is clamped between the protruding portion 39b and the mounting portion 33d. Thus, the adapter 31 is fixed to the panel 51.

In case where the other housing 33a is attached to the panel 51, the housing 33a is inserted into the window portion 52 in the manner similar to the operation of mounting the housing 33b to the panel 51.

Figure 4:
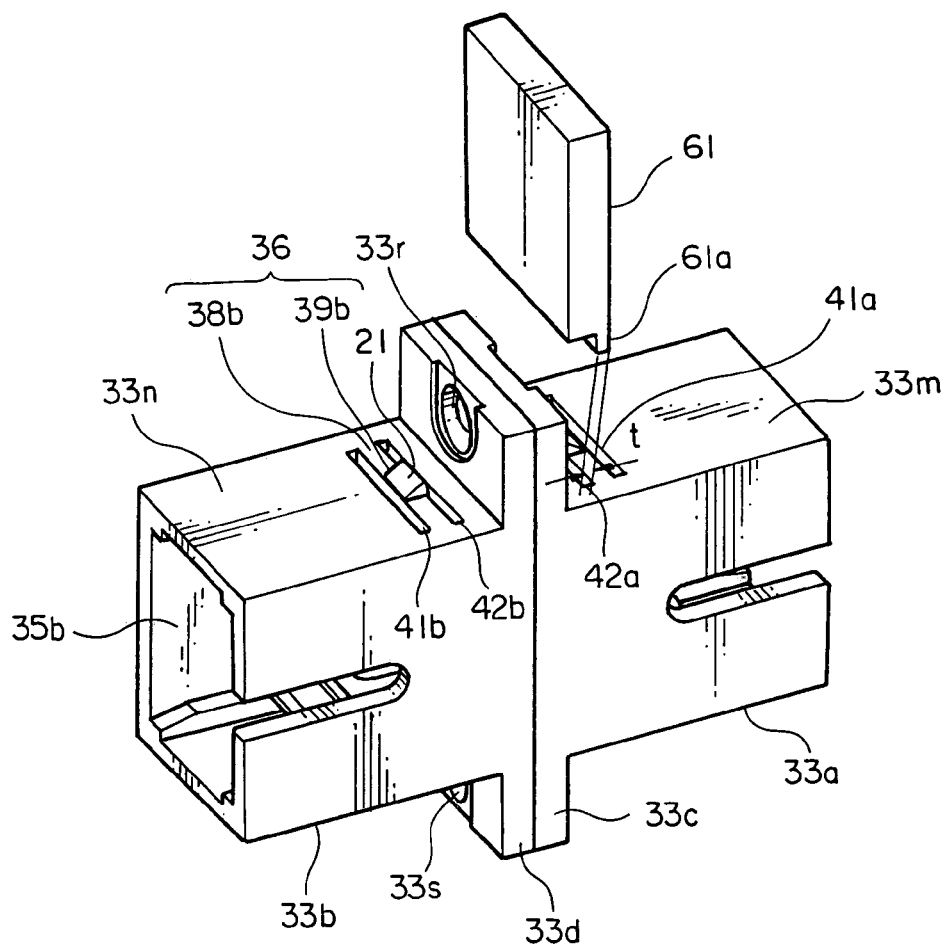
FIG. 4 is a perspective view of the optical connector illustrated in FIG. 1 together with mold components.

Each of the housings 33a and 33b may be formed from a resin material by mold forming. When the thickness of the panel 51 to which the housings 33a and 33b are mounted is changed, a size t of an end portion 61a of a flat mold component 61 is altered in order to change the width of the slits 41a, 42a, 41b, and 42b, as shown in FIG. 4. Thus, by simple change in size of the mold component 61, it is possible to meet the change in thickness of the panel 51. Accordingly, the adapter 31 can be mounted or changed without impairing the operability upon mounting and without increasing the number of components.

Figure 5:
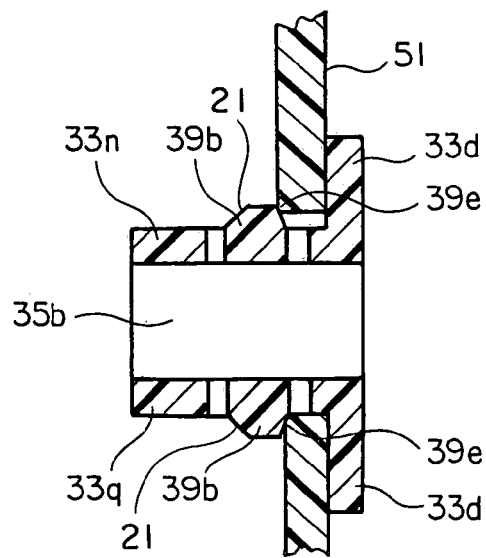
FIG. 5 is a sectional view of a modification of the optical connector illustrated in FIG. 1 without an internal mechanism.

Referring to FIG. 5, a modification of the housing will be described.

In FIG. 5, the protruding portion 39b is provided with a tapered surface 39e formed at a corner near the mounting portion 33d on the side faced to the mounting portion 33d. Thus, by forming the tapered surface 39e, it is possible to meet the change in thickness of the panel 51.

Although this invention has been described in conjunction with the preferred embodiment thereof, it will readily be understood that this invention may be modified in various other manners within the scope of the appended claims.

What is claimed is:

1. An optical connector having a housing defining an area surrounding a connection axis of the optical connector, the housing comprising: a pair of slits spaced from and adjacent to each other and extending parallel to each other in a direction perpendicular to the connection axis; an elastic portion defined between the slits; a protruding portion protruding from the elastic portion outward in a radial direction of the housing; and a mounting portion faced to the protruding portion with a space left therebetween.

2. The optical connector according to claim 1, wherein the mounting portion is disposed near the protruding portion in a direction parallel to the connection axis.

3. The optical connector according to claim 2, wherein the protruding portion has a slope inclined so that the height from the elastic portion is increased towards the mounting portion.

4. The optical connector according to claim 2, wherein the protruding portion has a tapered surface formed at a portion near the mounting portion.

5. The optical connector according to claim 2, wherein the housing has a polygonal cylindrical shape with a plurality of side walls, the slits being formed on at least one of the side walls.

6. The optical connector according to claim 2, wherein the housing has a rectangular cylindrical shape with four side walls, the slits being formed on the two side walls among the four side walls which are faced to each other, respectively.

7. The optical connector according to claim 2, wherein the mounting portion is disposed on an outer surface of an intermediate portion of the housing in the direction perpendicular to the connection axis.

8. The optical connector according to claim 2, wherein the mounting portion is a plate-like portion extending in a plane perpendicular to the connection axis.

9. The optical connector according to claim 1, further comprising: a splicing device disposed inside the housing and on the connection axis for assisting optical connection; and a holding member connected to the housing and holding the splicing device.

10. The optical connector according to claim 9, wherein the splicing device comprises a ferrule holding portion for holding two cylindrical ferrules used in connecting optical fibers, the ferrule holding portion being adapted for splicing the two cylindrical ferrules to each other.

11. An optical connection adapter comprising: a housing defining an area surrounding a connection axis of the optical connection adapter; a splicing device disposed inside the housing and on the connection axis for assisting optical connection; and a holding member connected to the housing and holding the splicing device, the housing comprising: a pair of slits spaced from and adjacent to each other and extending parallel to each other in a direction perpendicular to the connection axis; an elastic portion defined between the slits; a protruding portion protruding from the elastic portion outward in a radial direction of the housing; and a mounting portion faced to the protruding portion with a space left therebetween.

12. The optical connection adapter according to claim 11, wherein the splicing device comprises a ferrule holding portion for holding two cylindrical ferrules used in connecting optical fibers, the ferrule holding portion being adapted for splicing the two cylindrical ferrules to each other.

13. The optical connection adapter according to claim 11, wherein the mounting portion is disposed near the protruding portion in a direction parallel to the connection axis.

14. The optical connection adapter according to claim 13, wherein the protruding portion has a slope inclined so that the height from the elastic portion is increased towards the mounting portion.

15. The optical connection adapter according to claim 13, wherein the protruding portion has a tapered surface formed at a portion near the mounting portion.

16. The optical connection adapter according to claim 13, wherein the housing has a polygonal cylindrical shape with a plurality of side walls, the slits being formed on at least one of the side walls.

17. The optical connection adapter according to claim 13, wherein the housing has a rectangular cylindrical shape with four side walls, the slits being formed on the two side walls among the four side walls which are faced to each other, respectively.

18. The optical connection adapter according to claim 13, wherein the mounting portion is disposed on an outer surface of an intermediate portion of the housing in the direction perpendicular to the connection axis.

19. The optical connection adapter according to claim 13, wherein the mounting portion is a plate-like portion extending in a plane perpendicular to the connection axis.

* * * * *